United States Patent
Ahn et al.

(10) Patent No.: US 9,627,131 B2
(45) Date of Patent: Apr. 18, 2017

(54) MULTILAYER CERAMIC CAPACITOR HAVING AN INTERMITTING PART

(71) Applicant: SAMSUNG ELECTRO-MECHANICS CO., LTD., Suwon-Si, Gyeonggi-Do (KR)

(72) Inventors: Young Ghyu Ahn, Suwon-Si (KR); Young Key Kim, Suwon-Si (KR); Byoung Hwa Lee, Suwon-Si (KR); Min Cheol Park, Suwon-Si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 130 days.

(21) Appl. No.: 14/601,179

(22) Filed: Jan. 20, 2015

(65) Prior Publication Data

US 2016/0118187 A1   Apr. 28, 2016

(30) Foreign Application Priority Data

Oct. 22, 2014  (KR) .......................... 10-2014-0143675

(51) Int. Cl.
*H01G 2/16* (2006.01)
*H01G 4/30* (2006.01)
(Continued)

(52) U.S. Cl.
CPC ............... *H01G 2/16* (2013.01); *H01G 4/232* (2013.01); *H01G 4/30* (2013.01); *H01G 4/40* (2013.01); *H01G 4/1227* (2013.01)

(58) Field of Classification Search
CPC .. H01G 2/16; H01G 4/40; H01G 4/30; H01G 4/232; H01G 4/1227
See application file for complete search history.

(56) References Cited

U.S. PATENT DOCUMENTS 5,495,387 A * 2/1996 Mandai ..................... H01G 4/38
                                                         333/172
6,627,509 B2 * 9/2003 Duva ........................ H01G 2/12
                                                         361/321.2

(Continued)

FOREIGN PATENT DOCUMENTS

JP         03001514 A  *  1/1991
JP         03257809 A  * 11/1991
(Continued)

*Primary Examiner* — David M Sinclair
(74) *Attorney, Agent, or Firm* — McDermott Will & Emery LLP (57) ABSTRACT

A multilayer ceramic capacitor includes: a ceramic body; first and second internal electrodes disposed so as to be alternately exposed to both end surfaces of the ceramic body with each of dielectric layers; first and second external electrodes formed so as to be extended onto portions of one main surface of the ceramic body, respectively; third and fourth external electrodes formed on both side surfaces of the ceramic body, respectively, so as to be extended onto portions of both main surfaces of the ceramic body, respectively; an intermitting part connecting the third and fourth external electrodes to one another; first and second land patterns formed so as to be connected to the first and third external electrodes, respectively; and a third land pattern formed so as to be connected to both of the second and fourth external electrodes.

14 Claims, 9 Drawing Sheets

(51) Int. Cl.
*H01G 4/232* (2006.01)
*H01G 4/40* (2006.01)
H01G 4/12 (2006.01)

(56) References Cited

U.S. PATENT DOCUMENTS

| | | | | |
|---|---|---|---|---|
| 7,164,573 | B1 * | 1/2007 | Prymak | H01G 2/16 |
| | | | | 361/306.1 |
| 7,595,973 | B1 * | 9/2009 | Lee | H01G 4/005 |
| | | | | 361/303 |
| 2009/0059469 | A1 * | 3/2009 | Lee | H01G 4/012 |
| | | | | 361/306.2 |
| 2011/0043963 | A1 * | 2/2011 | Bultitude | H01G 2/16 |
| | | | | 361/321.4 |

FOREIGN PATENT DOCUMENTS

| | | | |
|---|---|---|---|
| JP | 09129476 A | * | 5/1997 |
| JP | 2003-007568 A | | 1/2003 |
| JP | 2004207526 A | * | 7/2004 |
| JP | 2013-502746 A | | 1/2013 |
| WO | 2011/028551 A2 | | 3/2011 |

* cited by examiner

MULTILAYER CERAMIC CAPACITOR HAVING AN INTERMITTING PART

CROSS-REFERENCE TO RELATED APPLICATION

This application claims the priority and benefit of Korean Patent Application No. 10-2014-0143675 filed on Oct. 22, 2014, with the Korean Intellectual Property Office, the disclosure of which is incorporated herein by reference.

BACKGROUND

The present disclosure relates to a multilayer ceramic capacitor (MLCC).

Multilayer ceramic capacitors, a type of multilayer chip electronic component, are chip type condensers mounted on the boards of various types of electronic products, such as image display devices, for example, liquid crystal displays (LCDs), or plasma display panels (PDPs), computers, personal digital assistants (PDAs), smartphones, cellular phones, serving to store electrical charges therein or to discharge electricity therefrom.

Such multilayer ceramic capacitors may be used as components of various electronic apparatuses due to advantages such as a small size, high capacitance, and ease of mounting.

On the other hand, however, in such multilayer ceramic capacitors, short-circuits may occur due to internal short-circuits or electrical overloads.

In such cases, an over-current may be transferred to remaining circuits connected to the multilayer ceramic capacitor, leading to an entire product connected to the multilayer ceramic capacitor being damaged.

SUMMARY

An aspect of the present disclosure may provide a method capable of improving electrical characteristics of a multilayer ceramic capacitor (MLCC) by minimizing an increase in equivalent series inductance (ESL) while increasing equivalent series resistance (ESR) and is capable of preventing over-currents in the MLCC from damaging an entire product connected to the MLCC by opening a circuit in a case in which a short-circuit occurs in the MLCC.

According to an aspect of the present disclosure, a multilayer ceramic capacitor may include: a ceramic body having a plurality of dielectric layers stacked in a thickness direction; a plurality of first internal electrodes and a plurality of second internal electrodes disposed in the ceramic body so as to be alternately exposed to both end surfaces of the ceramic body with each of the dielectric layers interposed therebetween; first and second external electrodes formed on both end surfaces of the ceramic body, respectively, so as to be extended onto portions of one main surface of the ceramic body, respectively, and connected to the first and second internal electrodes, respectively; third and fourth external electrodes formed on both side surfaces of the ceramic body, respectively, so as to be extended onto portions of both main surfaces of the ceramic body, respectively; an intermitting part formed on the other main surface of the ceramic body and connecting the third and fourth external electrodes to one another; first and second land patterns formed on one main surface of the ceramic body so as to be connected to the first and third external electrodes, respectively; and a third land pattern formed on one main surface of the ceramic body so as to be connected to both of the second and fourth external electrodes.

The multilayer ceramic capacitor may further include a dummy pattern formed on the dielectric layer on which the first or second internal electrode is formed, so as to be spaced apart from the first or second internal electrode, be exposed to at least one of both side surfaces of the ceramic body, and be connected to the third or fourth external electrode.

According to another aspect of the present disclosure, a multilayer ceramic capacitor may include: a ceramic body having a plurality of dielectric layers stacked in a thickness direction; a plurality of first internal electrodes and a plurality of second internal electrodes disposed in the ceramic body so as to be alternately exposed to both side surfaces of the ceramic body with each of the dielectric layers interposed therebetween; first and second external electrodes formed on both end surfaces of the ceramic body, respectively, so as to be extended onto portions of both main surfaces of the ceramic body, respectively; third and fourth external electrodes formed on both side surfaces of the ceramic body, respectively, so as to be extended onto portions of one main surface of the ceramic body, respectively, and connected to the first and second internal electrodes, respectively; an intermitting part formed on the other main surface of the ceramic body and connecting the first and second external electrodes to one another; first and second land patterns formed on one main surface of the ceramic body so as to be connected to the first and third external electrodes, respectively; and a third land pattern formed on one main surface of the ceramic body so as to be connected to both of the second and fourth external electrodes.

The first and second internal electrodes may have lead parts so as to be exposed to both side surfaces of the ceramic body, respectively.

The multilayer ceramic capacitor may further include a dummy pattern formed on the dielectric layer on which the first or second internal electrode is formed, so as to be spaced apart from the first or second internal electrode, be exposed to at least one of both end surfaces of the ceramic body, and be connected to the first or second external electrode.

According to another aspect of the present disclosure, a multilayer ceramic capacitor may include: a ceramic body having a plurality of dielectric layers stacked in a thickness direction; first and second external electrodes formed on one side surface of the ceramic body so as to be extended onto portions of both main surfaces of the ceramic body, respectively, and be spaced apart from one another; third and fourth external electrodes formed on the other side surface of the ceramic body so as to be extended onto portions of both main surfaces of the ceramic body, respectively, and be spaced apart from one another; a plurality of first internal electrodes and a plurality of second internal electrodes disposed in the ceramic body so as to be alternatively exposed through both side surfaces of the ceramic body, respectively, with each of the dielectric layers interposed therebetween, and connected, respectively, to the first and third external electrodes facing one another; an intermitting part formed on one main surface of the ceramic body and connecting the second and fourth external electrodes to one another; first and second land patterns formed on the other main surface of the ceramic body so as to be connected to the first and second external electrodes, respectively; and a third land pattern formed on the other main surface of the ceramic body so as to be connected to both of the third and fourth external electrodes.

The first and second internal electrodes may have lead parts so as to be exposed to both side surfaces of the ceramic body, respectively.

The multilayer ceramic capacitor may further include a dummy pattern formed on the dielectric layer on which the first or second internal electrode is formed, so as to be spaced apart from the first or second internal electrode, be exposed to at least one of both side surfaces of the ceramic body, and be connected to the second or fourth external electrode.

The intermitting part may be a fuse or a resistive pattern.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments in the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Directions of a hexahedron will be defined in order to clearly describe exemplary embodiments in the present disclosure. L, W and T indicated in the accompanying drawings refer to a length direction, a width direction, and a thickness direction, respectively.

Horizontal Mounting Type Multilayer Ceramic Capacitor

Figure 1:
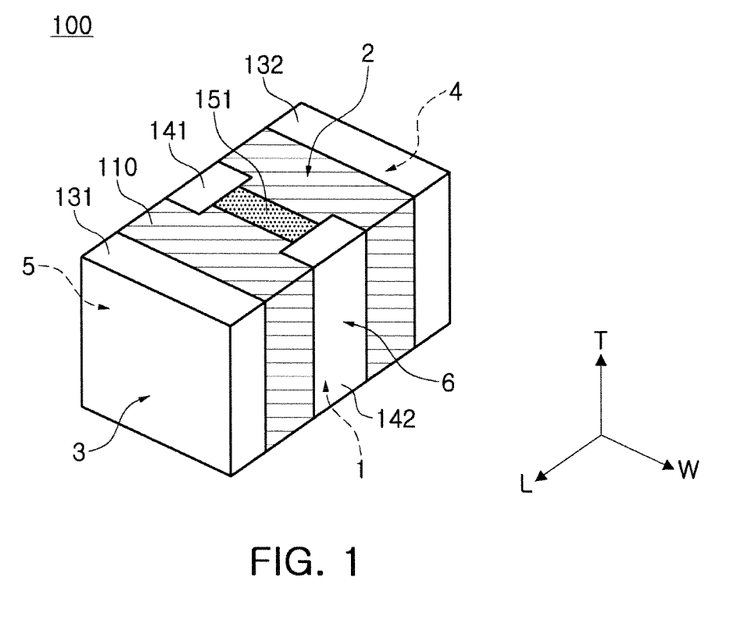
FIG. 1 is a perspective view schematically illustrating a multilayer ceramic capacitor (MLCC) according to an exemplary embodiment in the present disclosure.

FIG. 1 is a perspective view schematically illustrating a multilayer ceramic capacitor according to an exemplary embodiment in the present disclosure, and FIGS. 2A through 2D are exploded perspective views illustrating several examples of a structure in which first and second internal electrodes of the multilayer ceramic capacitor of FIG. 1 are stacked.

Figure 2A:
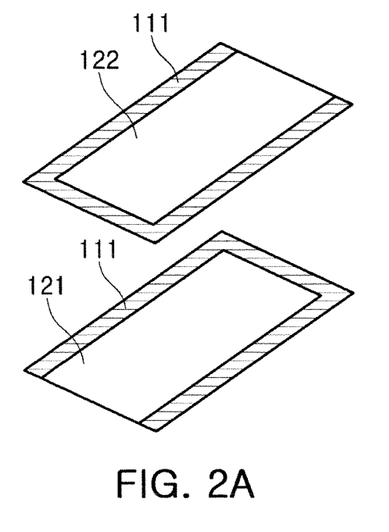
FIGS. 2A through 2D are exploded perspective views illustrating several examples of a structure in which first and second internal electrodes of the multilayer ceramic capacitor of FIG. 1 are stacked.
Figure 2B:
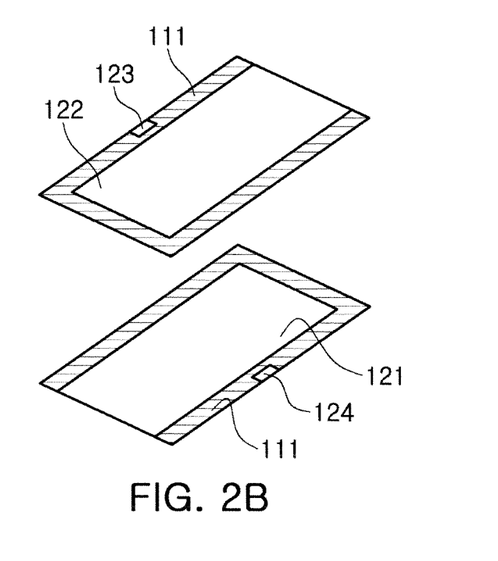
Figure 2C:
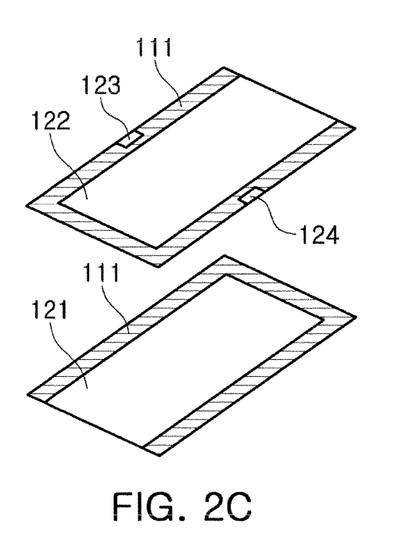
Figure 2D:
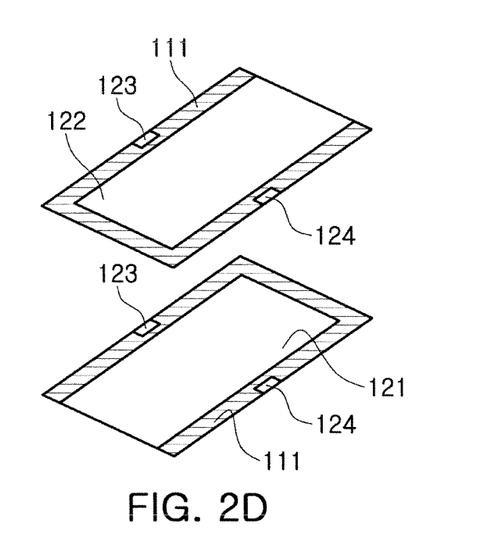

Referring to FIGS. 1 through 2D, a multilayer ceramic capacitor 100 according to an exemplary embodiment in the present disclosure may include a ceramic body 110, a plurality of first internal electrodes 121 and a plurality of second internal electrodes 122, first and second external electrodes 131 and 132 formed on both end surfaces of the ceramic body 110, respectively, third and fourth external electrodes 141 and 142 formed on both side surfaces of the ceramic body 110, respectively, first to third land patterns 161 to 163, and an intermitting part 151 formed on a surface opposite to a surface of the ceramic body 110 on which the land patterns are formed.

The ceramic body 110 may be formed by stacking a plurality of dielectric layers 111 in a thickness direction and then sintering the plurality of dielectric layers 111.

However, a shape and a dimension of the ceramic body 110 according to the exemplary embodiment and the number of stacked dielectric layers 111 are not limited to those of the present exemplary embodiments illustrated in FIGS. 1 through 2D.

Here, the plurality of dielectric layers 111 forming the ceramic body 110 may be in a sintered state.

Therefore, adjacent dielectric layers 111 may be integrated with one another such that boundaries therebetween are not readily discernible without a scanning electron microscope (SEM).

The ceramic body 110 may have a hexahedral shape.

In the exemplary embodiment in the present disclosure, first and second main surfaces 1 and 2 refer to surfaces of the ceramic body 110 opposing one another in a thickness direction, first and second end surfaces 3 and 4 refer to surfaces of the ceramic body 110 connecting the first and second main surfaces 1 and 2 to one another and opposing one another in a length direction, and first and second side surfaces 5 and 6 refer to surfaces of the ceramic body 110 opposing one another in a width direction.

Hereinafter, in the present exemplary embodiment, descriptions will be provided on the assumption that a mounting surface of the multilayer ceramic capacitor 100 is the first main surface 1 of the ceramic body 110.

The ceramic body 110 may include an active layer and cover layers.

The active layer, contributing to forming capacitance of the multilayer ceramic capacitor, may be a portion in which the plurality of internal electrodes are stacked in the ceramic body 110.

The cover layers, disposed on the first and second main surfaces 1 and 2 of the active layer, may be formed of the same material as that of the dielectric layer 111 of the active layer, and may have the same configuration as that of the dielectric layer 111 of the active layer except that the cover layers do not include the internal electrodes.

In addition, the cover layers may be disposed by stacking a single dielectric layer or two or more dielectric layers on the first and second main surfaces 1 and 2 of the active layer in the thickness direction, respectively.

The cover layers may serve to prevent the first and second internal electrodes 121 and 122 from being damaged due to physical or chemical stress.

The dielectric layers 111 may contain a high-k ceramic material.

The dielectric layers 111 may contain, for example, barium titanate ($BaTiO_3$) based ceramic powder particles. However, the type of the dielectric layers 111 is not limited thereto as long as sufficient capacitance may be obtained.

In addition, the dielectric layer 111 may further contain ceramic additives, organic solvents, plasticizers, binders, dispersants, and the like, as necessary, along with the ceramic material.

Here, as the ceramic additive, various types of materials such as a transition metal oxide or carbide, rare earth elements, magnesium (Mg), or aluminum (Al) may be used.

The plurality of first and second internal electrodes 121 and 122, having different polarities, may be alternately disposed in the thickness direction in the ceramic body 110 with each of the dielectric layers 111 interposed therebetween.

Here, the plurality of first and second internal electrodes 121 and 122 may be electrically insulated from one another by the dielectric layers 111 disposed therebetween.

The first and second internal electrodes 121 and 122 may be formed by printing a conductive paste containing a conductive metal on at least one surface of a ceramic sheet forming the dielectric layer 111.

The conductive metal contained in the conductive paste may be one of, for example, silver (Ag), palladium (Pd), platinum (Pt), nickel (Ni), and copper (Cu), or an alloy thereof. However, the type of conductive metal is not limited thereto.

In addition, as a scheme of printing the conductive paste, a screen printing scheme, a gravure printing scheme, or the like, may be used. However, the type of printing scheme is not limited thereto.

The first and second internal electrodes 121 and 122 may be disposed in the ceramic body 110 so as to be alternately exposed through the first and second end surfaces 3 and 4 of the ceramic body 110.

Here, capacitance of the multilayer ceramic capacitor 100 may be in proportion to an area in which the first and second internal electrodes 121 and 122 overlap in the thickness direction.

Referring to FIGS. 2B through 2D, dummy patterns 123 and 124 may be formed on the dielectric layer 111 on which the first or second internal electrode 121 or 122 is formed, so as to be spaced apart from the first or second internal electrode 121 or 122 and be exposed to at least one of the first and second side surfaces 5 and 6 of the ceramic body 110.

Here, the dummy pattern 123 or 124 may contact the third or fourth external electrode 141 or 142 based on the side surface to which it is exposed.

The dummy patterns 123 and 124 may serve to decrease steps for thicknesses of the first and second internal electrodes 121 and 122 and improve sticking force of the third and fourth external electrodes 141 and 142 in contact with only the intermitting part 151 in a state in which they do not contact the first and second internal electrodes 121 and 122.

The first and second external electrodes 131 and 132 may be formed on the first and second end surfaces 3 and 4 of the ceramic body 110, respectively, so as to be extended onto portions of the first main surface 1 of the ceramic body 110, respectively.

In addition, end portions of the first and second internal electrodes 121 and 122 exposed to the first and second end surfaces 3 and 4 of the ceramic body 110, respectively, may be electrically connected to the first and second external electrodes 131 and 132, respectively.

The third and fourth external electrodes 141 and 142 may be formed on the first and second side surfaces 5 and 6 of the ceramic body 110, respectively, so as to face one another, and may be extended onto portions of the first and second main surfaces 1 and 2 of the ceramic body 110, respectively.

The first to fourth external electrodes 131, 132, 141, and 142 may be formed of a conductive paste containing a conductive metal.

The conductive metal may be one of, for example, Ni, Cu, and tin (Sn), or an alloy thereof, but is not limited thereto.

The conductive paste may further contain an insulating material.

The insulating material may be, for example, glass. However, the type of insulating material is not limited thereto.

Further, in the present exemplary embodiment, a scheme of forming the first to fourth external electrodes 131, 132, 141, and 142 is not particularly limited. That is, several schemes such as a scheme of forming the first to fourth external electrodes 131, 132, 141, and 142 by dipping the ceramic body 110 in a conductive paste, or by plating may be used.

Meanwhile, a plating layer (not illustrated) may be further formed on the first to fourth external electrodes 131, 132, 141, and 142 by using a scheme such as an electroplating scheme.

The plating layer may include a Ni plating layer formed on the first to fourth external electrodes 131, 132, 141, and 142 and a Sn plating layer formed on the Ni plating layer.

The plating layer may serve to increase adhesion strength between the multilayer ceramic capacitor 100 and a substrate when the multilayer ceramic capacitor 100 is mounted on the substrate, or the like, using solders.

Figure 3:
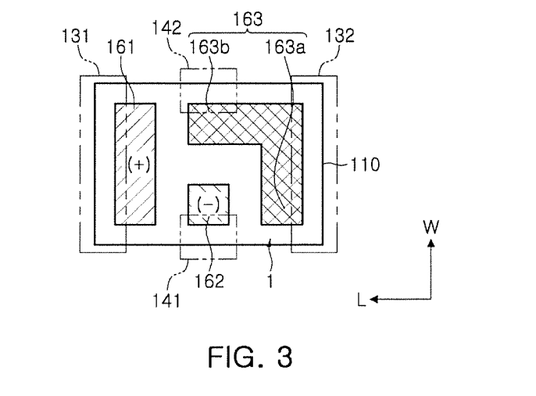
FIG. 3 is a bottom view of the multilayer ceramic capacitor of FIG. 1.

Referring to FIG. 3, the first and second land patterns 161 and 162 may be formed on the first main surface 1 of the ceramic body 110, and may be connected to the first and third external electrodes 131 and 141, respectively.

The third land pattern 163 may have a structure in which a portion 163a connected to the second external electrode 132 and a portion 163b connected to the fourth external electrode 142 are connected to one another, and may connect the second and fourth external electrodes 132 and 142 to one another.

The intermitting part 151 may be formed on the second main surface 2 of the ceramic body 110, and may connect the third and fourth external electrodes 141 and 142 to one another on the second main surface 2 of the ceramic body 110.

The intermitting part 151 may be short-circuited in a case in which a short-circuit occurs due to an internal short-circuit, an electrical overload, or the like, thereby opening a circuit. Consequently, the intermitting part 151 may prevent an over-current generated in the multilayer ceramic capacitor 100 from being transferred to remaining circuits connected to the multilayer ceramic capacitor 100, thereby preventing an entire product from being damaged.

Here, the intermitting part 151 may be a fuse, a resistive pattern, or the like. However, the type of the intermitting part 151 is not limited thereto.

Figure 4A:
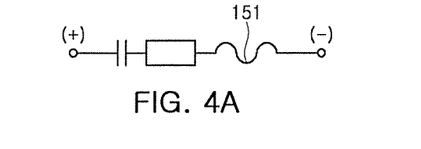
FIGS. 4A and 4B are circuit diagrams illustrating an equivalent circuit of the multilayer ceramic capacitor according to an exemplary embodiment in the present disclosure.

FIG. 4A illustrates an equivalent circuit of the multilayer ceramic capacitor 100 according to an exemplary embodiment in the present disclosure in which a fuse is used as the intermitting part 151.

The fuse, serving to prevent an over-current, may need to have a resistance level enough to generate heat to break itself in a case in which an over-current having a predetermined level or more is generated. The resistance level of the fuse may be determined based on, for example, a reference level of a current applied to the capacitor.

Figure 4B:
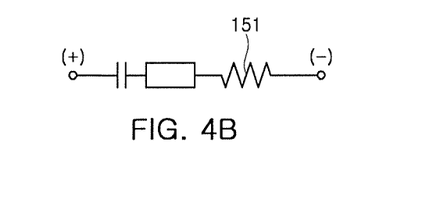

FIG. 4B illustrates an equivalent circuit of the multilayer ceramic capacitor 100 according to an exemplary embodiment in the present disclosure in which a resistive pattern is used as the intermitting part 151.

The resistive pattern may include one of a resistor, a varistor, and a thermistor. However, the type of resistive pattern is not limited thereto.

The resistive pattern may be used in order to adjust an equivalent series resistance (ESR) level to a required level, for example, in a case in which it is required for the multilayer ceramic capacitor to have a high ESR level in order to prevent radiation noise or decrease a voltage variation at a predetermined frequency.

Here, a resistance level of the resistive pattern is not limited, but may be variously set to, for example, several hundred milliohms (ma) to several ohms ($\Omega$).

In addition, in a case in which a short-circuit occurs in the multilayer ceramic capacitor 100, an over-current may be transferred to remaining circuits connected to the multilayer ceramic capacitor 100, thereby damaging an entire product connected to the multilayer ceramic capacitor 100.

In the present exemplary embodiment, the first external electrode 131 connected to the first internal electrodes 121 may be a positive electrode, and the fourth external electrode 142 may be a negative electrode.

When power is applied to the multilayer ceramic capacitor 100, a current path may move from the first external electrode 131, the positive electrode, to the second external electrode 132 through the first and second internal electrodes 121 and 122, may move to the third external electrode 141 through the third land pattern 163, and then may move to the fourth external electrode 142, the negative electrode, through the intermitting part 151.

Therefore, according to the present exemplary embodiment, since the current path is relatively long and a current passes through a resistor having a relatively narrow width, an ESL increase effect may be expected.

In addition, the intermitting part 151 connecting the third and fourth external electrodes 142 and 142 to one another may be formed on the second main surface 2 of the ceramic body 110. Therefore, in the case in which the short-circuit occurs in the multilayer ceramic capacitor 100, the intermitting part 151 may be short-circuited to allow the circuit to be in an open state, thereby preventing the over-current from being transferred to the remaining circuits connected to the multilayer ceramic capacitor 100 to prevent the entire product connected to the multilayer ceramic capacitor 100 from being damaged.

Therefore, in the case in which the short-circuit occurs in the multilayer ceramic capacitor 100, only a portion corresponding to the multilayer ceramic capacitor 100 of the entire product may be replaced, repaired, and reused.

Modified Example

Figure 5:
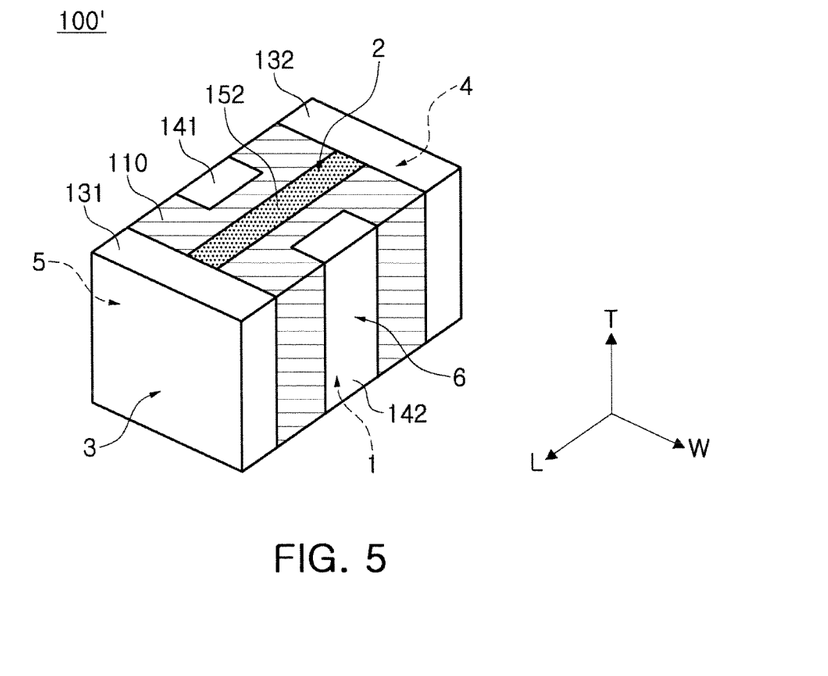
FIG. 5 is a perspective view schematically illustrating a multilayer ceramic capacitor according to another exemplary embodiment in the present disclosure.

FIG. 5 is a perspective view schematically illustrating a multilayer ceramic capacitor according to another exemplary embodiment in the present disclosure, and FIGS. 6A through 6D are exploded perspective views illustrating several examples of a structure in which first and second internal electrodes of the multilayer ceramic capacitor of FIG. 5 are stacked.

Here, a detailed description of structures similar to those of the multilayer ceramic capacitor according to the exemplary embodiment in the present disclosure described above will be omitted in order to avoid repetition, and a description pertaining to a connection structure between a lead part and an external electrode, which is different from the structure of the multilayer ceramic capacitor according to the exemplary embodiment in the present disclosure described above, will be provided in detail.

Figure 6A:
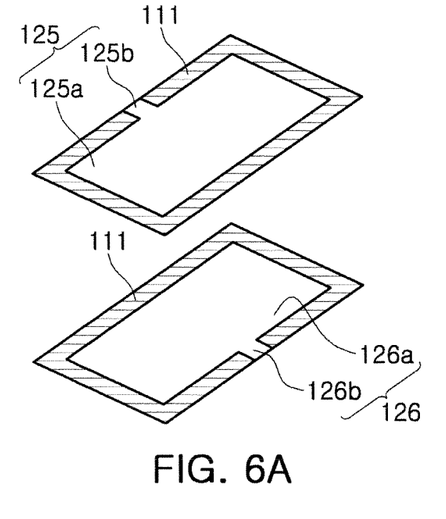
FIGS. 6A through 6D are exploded perspective views illustrating several examples of a structure in which first and second internal electrodes of the multilayer ceramic capacitor of FIG. 5 are stacked.
Figure 6B:
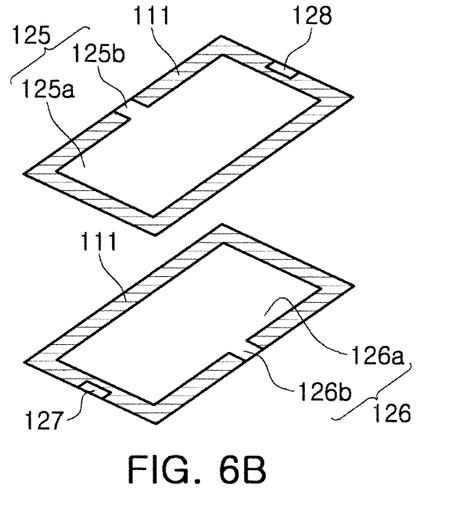
Figure 6C:
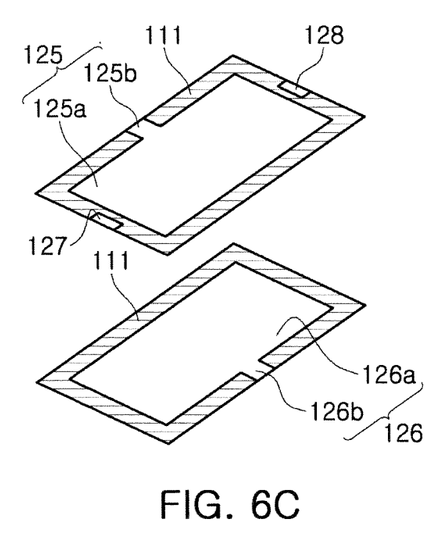
Figure 6D:
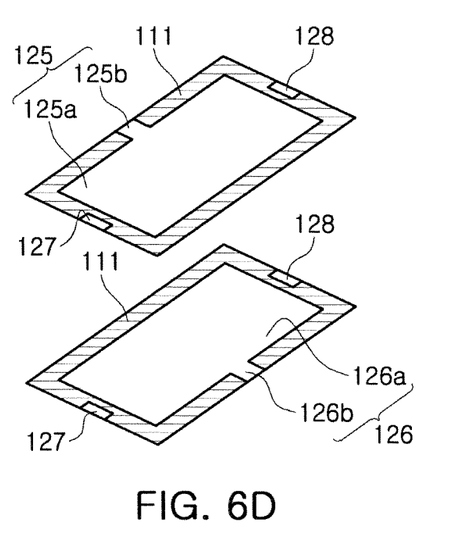

Referring to FIGS. 5 through 6D, a multilayer ceramic capacitor 100' according to another exemplary embodiment in the present disclosure may include a ceramic body 110, a plurality of first internal electrodes 125 and a plurality of second internal electrodes 126, first and second external electrodes 131 and 132 formed on first and second end surfaces 3 and 4 of the ceramic body 110, respectively, third and fourth external electrodes 141 and 142 formed on first and second side surfaces 5 and 6 of the ceramic body 110, respectively, first to third land patterns 161 to 163, and an intermitting part 152 formed on a second main surface 2 of the ceramic body 110, which is a surface opposite to a surface of the ceramic body 110 on which the land patterns are formed.

The first and second internal electrodes 125 and 126 may be disposed in the ceramic body 110 so as to be alternately exposed through the first and second side surfaces 5 and 6 of the ceramic body 110.

The first and second internal electrodes 125 and 126 may include first and second capacitance parts 125a and 126a overlapping one another to provide capacitance, and first and second lead parts 125b and 126b extended from the first and second capacitance parts 125a and 126a towards the first or second side surface 5 or 6 of the ceramic body 110, respectively.

The first lead part 125b may be exposed to the first side surface 5 of the ceramic body 110 to be connected to the third external electrode 141.

The second lead part 126b may be exposed to the second side surface 6 of the ceramic body 110 to be connected to the fourth external electrode 142.

Meanwhile, dummy patterns 127 and 128 may be formed on the dielectric layer 111 on which the first or second internal electrode 125 or 126 is formed, so as to be spaced apart from the first or second internal electrode 125 or 126 and be exposed to at least one of the first and second end surfaces 3 and 4 of the ceramic body 110.

Here, the dummy pattern 127 or 128 may contact the first or second external electrode 131 or 132 based on the end surface to which it is exposed.

The dummy patterns 127 and 128 may serve to decrease steps for thicknesses of the first and second internal electrodes 125 and 126 and improve sticking force of the first and second external electrodes 131 and 132 in contact with only the intermitting part 151 in a state in which they do not contact the first and second internal electrodes 125 and 126.

The first and second external electrodes 131 and 132 may be formed on the first and second end surfaces 3 and 4 of the ceramic body 110, respectively, so as to be extended onto portions of the first and second main surfaces 1 and 2 thereof, respectively.

The third and fourth external electrodes 141 and 142 may be formed on the first and second side surfaces 5 and 6 of the ceramic body 110, respectively, so as to face one another, and may be extended onto portions of the first main surface 1 of the ceramic body 110, respectively. Here, as necessary, the third and fourth external electrodes 141 and 142 may be extended onto portions of the second main surface 2 of the ceramic body 110, respectively.

Figure 7:
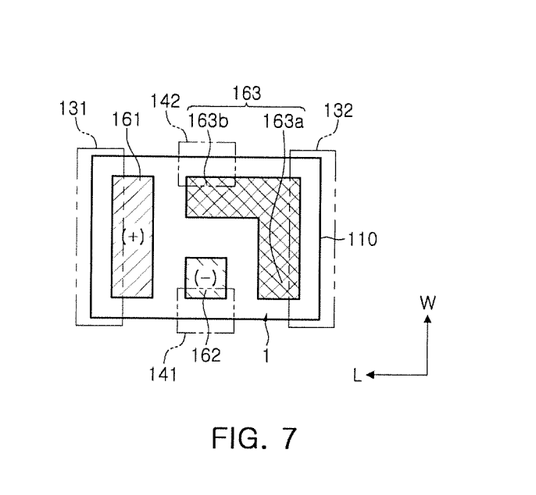
FIG. 7 is a bottom view of the multilayer ceramic capacitor of FIG. 5.

Referring to FIG. 7, the first and second land patterns 161 and 162 may be formed on the first main surface 1 of the ceramic body 110 to be connected to the first and third external electrodes 131 and 141, respectively.

The third land pattern 163 may have a structure in which a portion 163*a* connected to the second external electrode 132 and a portion 163*b* connected to the fourth external electrode 142 are connected to one another, and may connect the second and fourth external electrodes 132 and 142 to one another.

The intermitting part 152 may be formed on the second main surface 2 of the ceramic body 110, and may connect the first and second external electrodes 131 and 132 to one another on the second main surface 2 of the ceramic body 110.

The intermitting part 152 may be short-circuited in a case in which a short-circuit occurs due to an internal short-circuit, an electrical overload, or the like, thereby opening a circuit. Accordingly, the intermitting part 152 may prevent an over-current generated in the multilayer ceramic capacitor 100' from being transferred to remaining circuits connected to the multilayer ceramic capacitor 100', thereby preventing an entire product from being damaged.

Here, the intermitting part 152 may be a fuse, a resistive pattern, or the like. However, the type of the intermitting part 152 is not limited thereto.

Figure 8A:
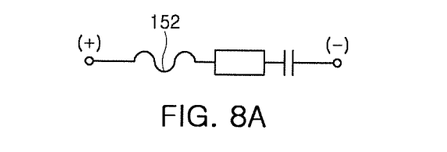
FIGS. 8A and 8B are circuit diagrams illustrating equivalent circuits of a multilayer ceramic capacitor according to another exemplary embodiment in the present disclosure.

In FIG. 8A illustrates an equivalent circuit of the multilayer ceramic capacitor 100' according to an exemplary embodiment in the present disclosure in which the fuse is used as the intermitting part 152.

Figure 8B:
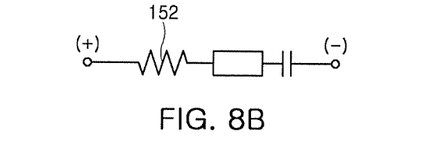

In FIG. 8B illustrates an equivalent circuit of the multilayer ceramic capacitor 100' according to an exemplary embodiment in the present disclosure in which the resistive pattern is used as the intermitting part 152.

Figure 9:
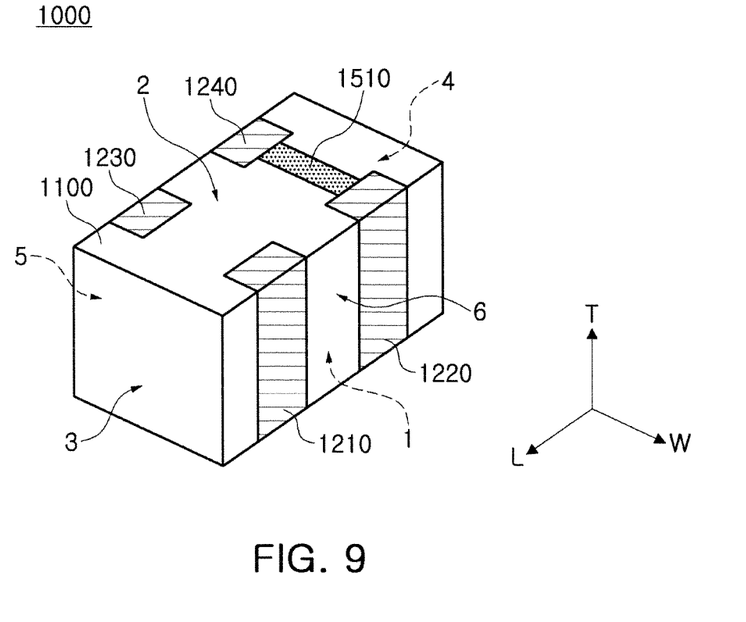
FIG. 9 is a perspective view schematically illustrating a multilayer ceramic capacitor according to another exemplary embodiment in the present disclosure.

FIG. 9 is a perspective view schematically illustrating a multilayer ceramic capacitor according to another exemplary embodiment in the present disclosure, and FIGS. 10A through 10D are exploded perspective views illustrating several examples of a structure in which first and second internal electrodes of the multilayer ceramic capacitor of FIG. 9 are stacked.

Here, a detailed description of structures similar to those of the multilayer ceramic capacitor according to the exemplary embodiment in the present disclosure described above will be omitted in order to avoid repetition, and a description pertaining to a connection structure between a lead part and an external electrode, which is different from the structure of the multilayer ceramic capacitor according to the exemplary embodiment in the present disclosure described above, will be provided in detail.

Figure 10A:
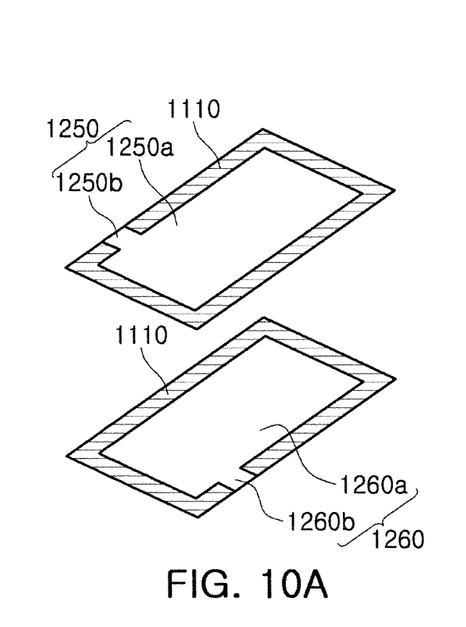
FIGS. 10A through 10D are exploded perspective views illustrating several examples of a structure in which first and second internal electrodes of the multilayer ceramic capacitor of FIG. 9 are stacked.
Figure 10B:
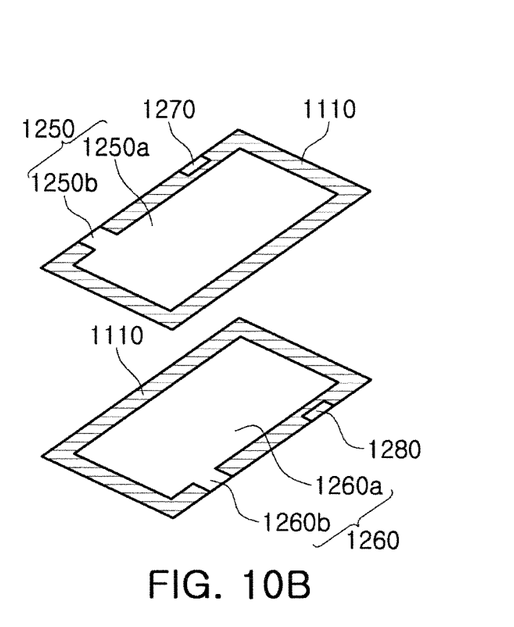
Figure 10C:
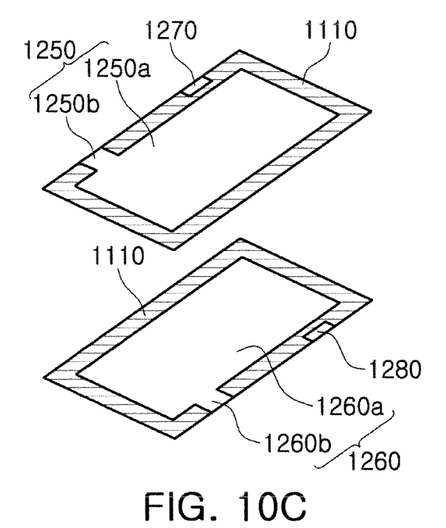
Figure 10D:
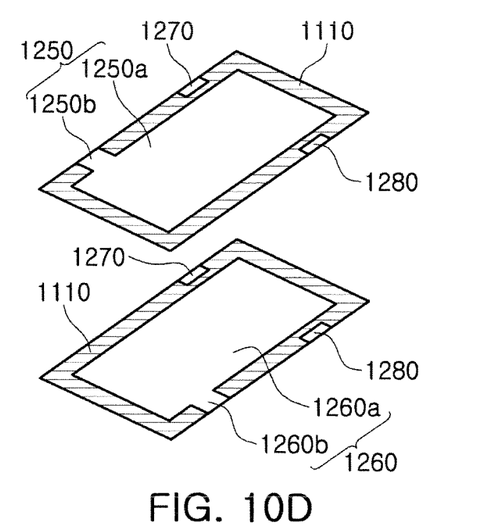

Referring to FIGS. 9 through 10D, a multilayer ceramic capacitor 1000 according to another exemplary embodiment in the present disclosure may include a ceramic body 1100, a plurality of first internal electrodes 1250 and a plurality of second internal electrodes 1260, first and second external electrodes 1210 and 1220 formed on a second side surface 6 of the ceramic body 1100 so as to be extended onto portions of first and second main surfaces 1 and 2 of the ceramic body 1100 and be spaced apart from one another, third and fourth external electrodes 1230 and 1240 formed on a first side surface 5 of the ceramic body 1100 so as to be extended onto portions of the first and second main surfaces 1 and 2 of the ceramic body 1100 and be spaced apart from one another, first to third land patterns 1610 to 1630, and an intermitting part 1510 formed on the second main surface 2 of the ceramic body 1100.

The first and second internal electrodes 1250 and 1260 may be disposed in the ceramic body 1100 so as to be alternately exposed through the first and second side surfaces 5 and 6 of the ceramic body 1100.

The first and second internal electrodes 1250 and 1260 may include first and second capacitance parts 1250*a* and 1260*a* overlapping one another to provide capacitance, and first and second lead parts 1250*b* and 1260*b* extended from the first and second capacitance parts 1250*a* and 1260*a* towards the first or second side surface 5 or 6, respectively.

The first lead part 1250*b* may be exposed to the first side surface 5 of the ceramic body 1100 to be connected to the third external electrode 1230.

The second lead part 1260*b* may be exposed to the second side surface 6 of the ceramic body 1100 to be connected to the first external electrode 1210.

Meanwhile, dummy patterns 1270 and 1280 may be formed on a dielectric layer 1110 on which the first or second internal electrode 1250 or 1260 is formed, so as to be spaced apart from the first or second internal electrode 1250 or 1260 and be exposed to at least one of the first and second side surfaces 5 and 6 of the ceramic body 1100.

Here, the dummy pattern 1270 or 1280 may contact the second or fourth external electrode 1220 or 1240 based on the side surface to which it is exposed.

The dummy patterns 1270 and 1280 may serve to decrease steps for thicknesses of the first and second internal electrodes 1250 and 1260 and improve sticking force of the first and second external electrodes 1210 and 1220 in contact with only the intermitting part 1510 in a state in which they do not contact the first and second internal electrodes 1250 and 1260.

Figure 11:
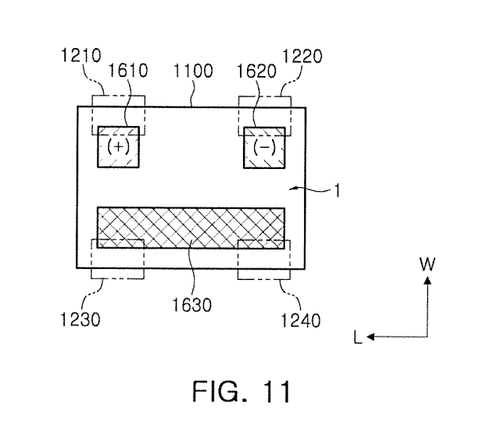
FIG. 11 is a bottom view of the multilayer ceramic capacitor of FIG. 9.

Referring to FIG. 11, the first and second land patterns 1610 and 1620 may be formed on the first main surface 1 of the ceramic body 1100 and be connected to the first and second external electrodes 1210 and 1220, respectively.

The third land pattern 1630 may be connected to both of the third and fourth external electrodes 1230 and 1240.

The intermitting part 1510 may be formed on the second main surface 2 of the ceramic body 1100, and may connect the second and fourth external electrodes 1220 and 1240 to one another on the second main surface 2 of the ceramic body 1100.

The intermitting part 1510 may be short-circuited in a case in which a short-circuit occurs due to an internal short-circuit, an electrical overload, or the like, thereby opening a circuit. Accordingly, the intermitting part 1510 may prevent an over-current generated in the multilayer ceramic capacitor 1000 from being transferred to remaining circuits connected to the multilayer ceramic capacitor 1000, thereby preventing an entire product from being damaged.

Here, the intermitting part 1510 may be a fuse, a resistive pattern, or the like. However, the type of the intermitting part 1510 is not limited thereto.

Figures 12A, 12B:
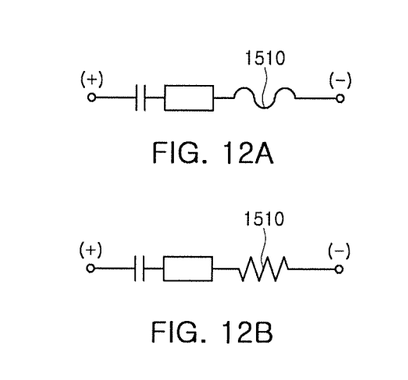
FIGS. 12A and 12B are circuit diagrams illustrating equivalent circuits of a multilayer ceramic capacitor according to another exemplary embodiment in the present disclosure.

In FIG. 12A illustrates an equivalent circuit of the multilayer ceramic capacitor 1000 according to an exemplary embodiment in the present disclosure in which the fuse is used as the intermitting part 1510.

In FIG. 12B illustrates an equivalent circuit of the multilayer ceramic capacitor 1000 according to an exemplary embodiment in the present disclosure in which the resistive pattern is used as the intermitting part 1510.

As set forth above, according to exemplary embodiments of the present disclosure, the intermitting part connecting adjacent external electrodes to one another may be formed on a surface opposite to the mounting surface of the ceramic body. Therefore, in the case in which the short-circuit occurs in the multilayer ceramic capacitor, the intermitting part may be short-circuited to allow the circuit to be in the open state, thereby preventing the over-current from being transferred to the remaining circuits connected to the multilayer ceramic capacitor to prevent the entire product connected to the multilayer ceramic capacitor from being damaged.

While exemplary embodiments have been shown and described above, it will be apparent to those skilled in the art that modifications and variations could be made without departing from the scope of the present invention as defined by the appended claims.

What is claimed is:

1. A multilayer ceramic capacitor (MLCC) comprising:
   a ceramic body having a plurality of dielectric layers stacked in a thickness direction;
   a plurality of first internal electrodes and a plurality of second internal electrodes disposed in the ceramic body so as to be alternately exposed to both end surfaces of the ceramic body with each of the dielectric layers interposed therebetween;
   first and second external electrodes formed on both end surfaces of the ceramic body, respectively, so as to be extended onto portions of one main surface of the ceramic body, respectively, and connected to the first and second internal electrodes, respectively;
   third and fourth external electrodes formed on both side surfaces of the ceramic body, respectively, so as to be extended onto portions of both main surfaces of the ceramic body, respectively;
   an intermitting part formed on the other main surface of the ceramic body and electrically connecting the third and fourth external electrodes to one another;
   first and second land patterns formed on one main surface of the ceramic body so as to be connected to the first and third external electrodes, respectively; and
   a third land pattern formed on one main surface of the ceramic body so as to be connected to both of the second and fourth external electrodes.

2. The multilayer ceramic capacitor of claim 1, wherein the intermitting part is a fuse.

3. The multilayer ceramic capacitor of claim 1, wherein the intermitting part is a resistive pattern.

4. The multilayer ceramic capacitor of claim 1, further comprising a dummy pattern formed on the dielectric layer on which the first or second internal electrode is formed, so as to be spaced apart from the first or second internal electrode, be exposed to at least one of both side surfaces of the ceramic body, and be connected to the third or fourth external electrode.

5. A multilayer ceramic capacitor comprising:
   a ceramic body having a plurality of dielectric layers stacked in a thickness direction;
   a plurality of first and second internal electrodes disposed in the ceramic body so as to be alternately exposed to both side surfaces of the ceramic body with each of the dielectric layers interposed therebetween;
   first and second external electrodes formed on both end surfaces of the ceramic body, respectively, so as to be extended onto portions of both main surfaces of the ceramic body, respectively;
   third and fourth external electrodes formed on both side surfaces of the ceramic body, respectively, so as to be extended onto portions of one main surface of the ceramic body, respectively, and connected to the first and second internal electrodes, respectively;
   an intermitting part formed on the other main surface of the ceramic body and electrically connecting the first and second external electrodes to one another;
   first and second land patterns formed on one main surface of the ceramic body so as to be connected to the first and third external electrodes, respectively; and
   a third land pattern formed on one main surface of the ceramic body so as to be connected to both of the second and fourth external electrodes.

6. The multilayer ceramic capacitor of claim 5, wherein the intermitting part is a fuse.

7. The multilayer ceramic capacitor of claim 5, wherein the intermitting part is a resistive pattern.

8. The multilayer ceramic capacitor of claim 5, wherein the first and second internal electrodes have lead parts so as to be exposed to both side surfaces of the ceramic body, respectively.

9. The multilayer ceramic capacitor of claim 5, further comprising a dummy pattern formed on the dielectric layer on which the first or second internal electrode is formed, so as to be spaced apart from the first or second internal electrode, be exposed to at least one of both end surfaces of the ceramic body, and be connected to the first or second external electrode.

10. A multilayer ceramic capacitor comprising:
    a ceramic body having a plurality of dielectric layers stacked in a thickness direction;
    first and second external electrodes formed on one side surface of the ceramic body so as to be extended onto portions of both main surfaces of the ceramic body, respectively, and be spaced apart from one another;
    third and fourth external electrodes formed on the other side surface of the ceramic body so as to be extended onto portions of both main surfaces of the ceramic body, respectively, and be spaced apart from one another;
    a plurality of first internal electrodes and a plurality of second internal electrodes disposed in the ceramic body so as to be alternatively exposed through both side surfaces of the ceramic body, respectively, with each of the dielectric layers interposed therebetween, and connected, respectively, to the first and third external electrodes facing one another;
    an intermitting part formed on one main surface of the ceramic body and electrically connecting the second and fourth external electrodes to one another;
    first and second land patterns formed on the other main surface of the ceramic body so as to be connected to the first and second external electrodes, respectively; and
    a third land pattern formed on the other main surface of the ceramic body so as to be connected to both of the third and fourth external electrodes.

11. The multilayer ceramic capacitor of claim 10, wherein the intermitting part is a fuse.

12. The multilayer ceramic capacitor of claim 10, wherein the intermitting part is a resistive pattern.

13. The multilayer ceramic capacitor of claim 10, wherein the first and second internal electrodes have lead parts so as to be exposed to both side surfaces of the ceramic body, respectively.

14. The multilayer ceramic capacitor of claim 10, further comprising a dummy pattern formed on the dielectric layer on which the first or second internal electrode is formed, so as to be spaced apart from the first or second internal electrode, be exposed to at least one of both side surfaces of the ceramic body, and be connected to the second or fourth external electrode.

* * * * *